March 4, 1941.  C. H. VAN DUSER  2,234,150
PHOTOFLASH SYNCHRONIZER FOR CAMERAS
Filed Sept. 14, 1939  4 Sheets-Sheet 1
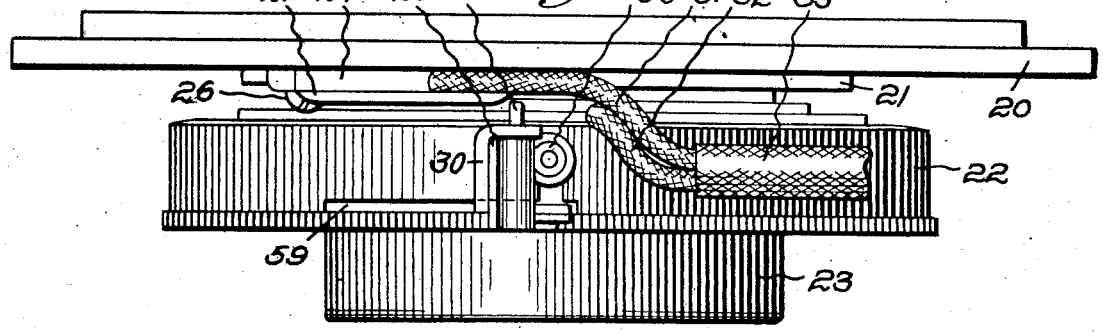
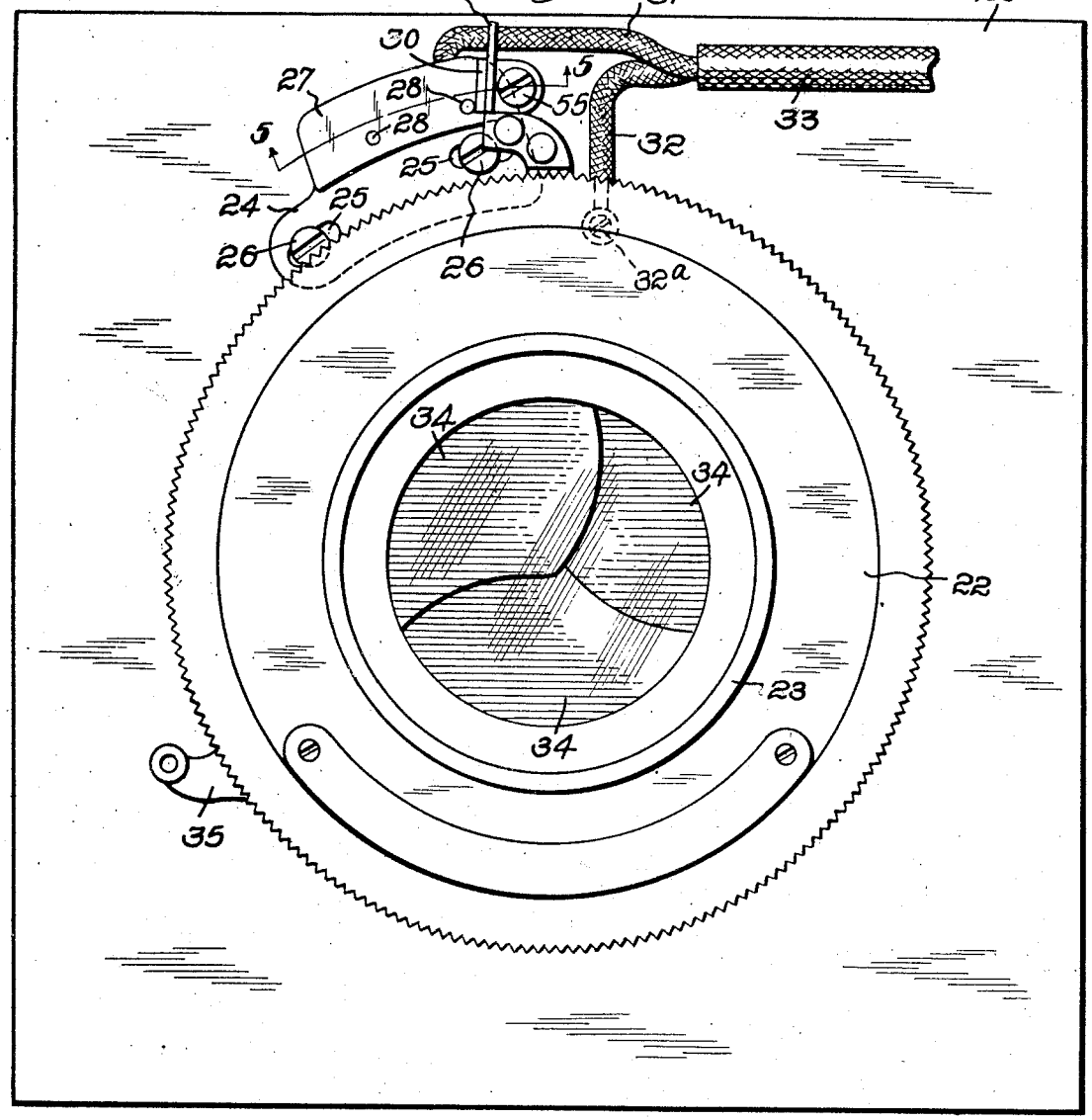
Inventor:
Clarence H. Van Duser,
by Emery Booth Townsend Miller Weidner Attys.

March 4, 1941.  C. H. VAN DUSER  2,234,150
PHOTOFLASH SYNCHRONIZER FOR CAMERAS
Filed Sept. 14, 1939  4 Sheets-Sheet 2
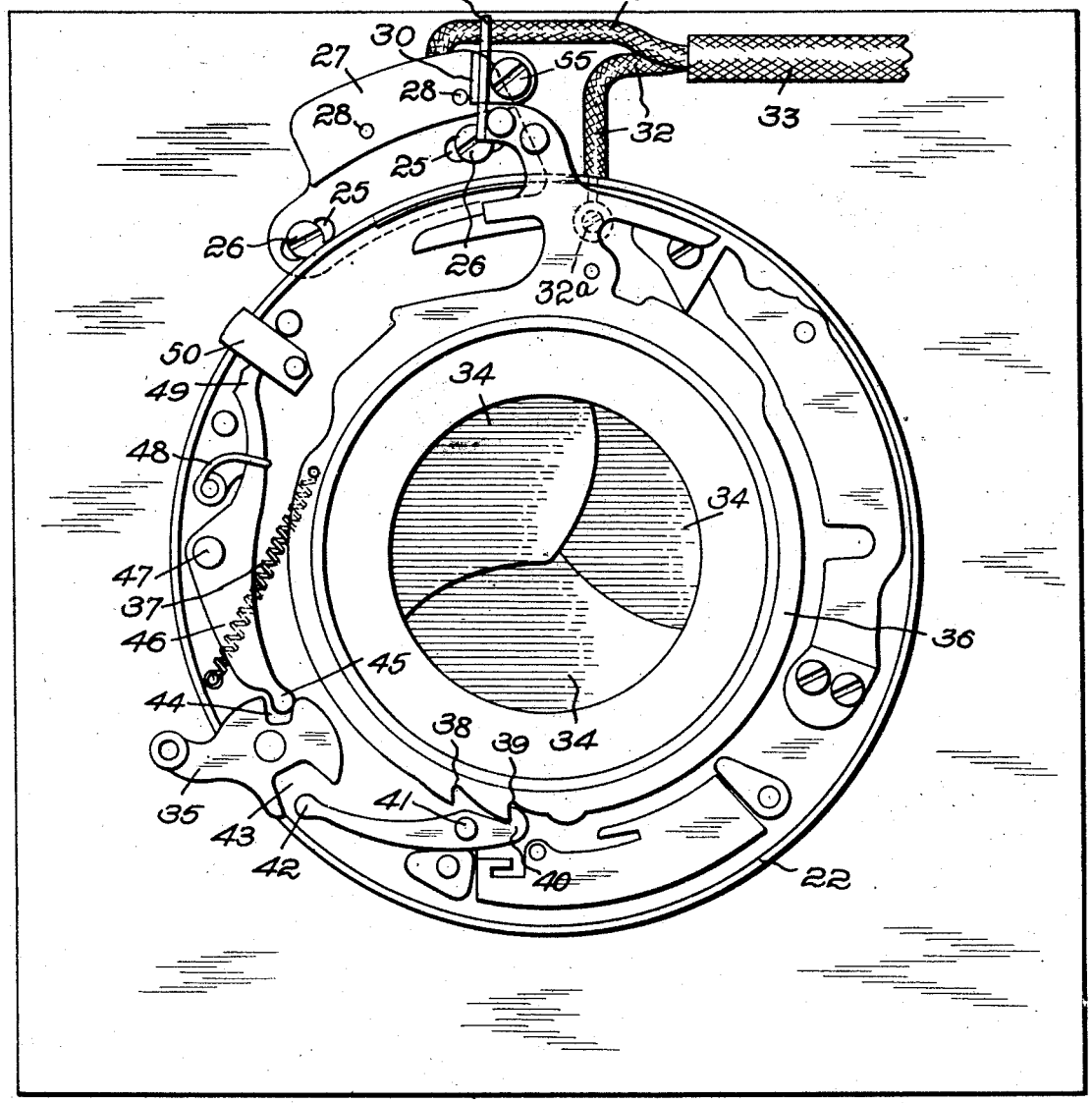
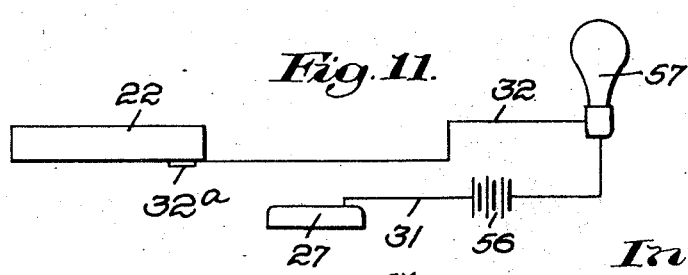
Inventor:
Clarence H. Van Duser,
by Emery Booth Townsend Miller Weidner
Attys Inventor:
Clarence H. Van Duser

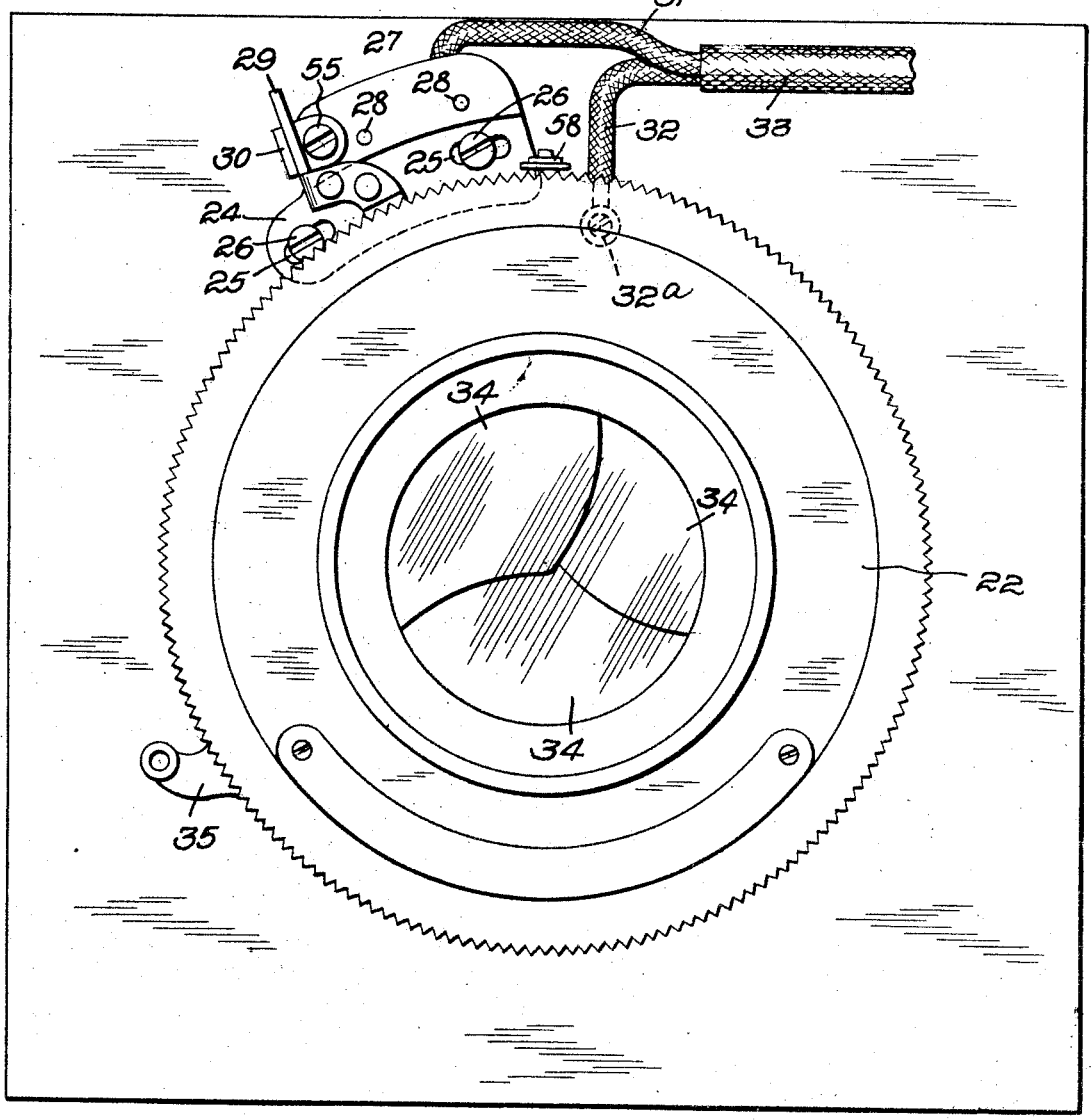
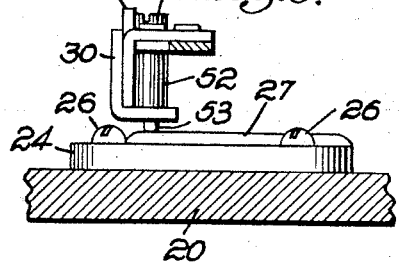
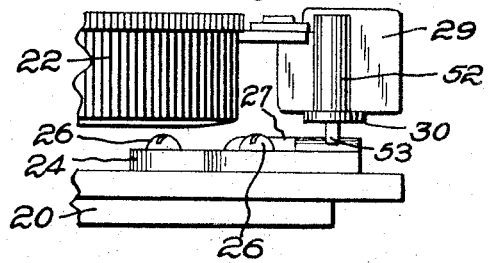

Patented Mar. 4, 1941

2,234,150

UNITED STATES PATENT OFFICE 2,234,150

PHOTOFLASH SYNCHRONIZER FOR CAMERAS

Clarence H. Van Duser, Rochester, N. Y., assignor to The Folmer Graflex Corporation, Rochester, N. Y., a corporation of Delaware Application September 14, 1939, Serial No. 294,892

10 Claims. (Cl. 67—29)

This invention relates to photoflash synchronizers for cameras.

In order that the principle of the invention may be readily understood, I have disclosed a single embodiment thereof in the accompanying drawings, wherein—

Fig. 1 is a top plan view of a between-the-lens shutter equipped with my photoflash synchronizing device or mechanism;

Fig. 2 is a front elevation of the said shutter showing the shutter setting lever in the set position and the shutter leaves closed;

Fig. 3 is a view similar to Fig. 2 with the shutter plate and lens removed, so as to show those parts of the shutter requiring modification to adapt it to my invention;

Fig. 8 is a view similar to Fig. 2, but wherein the shutter setting or reset lever has been moved all the way to the left;

Fig. 9 is a detail of the contacts when in the position shown in Fig. 8;

Fig. 10 is a side view of the shutter, more clearly showing the position of the contacts; and Fig. 11 is a circuit diagram of the shutter contacts, flash bulb and battery.

Figure 4:
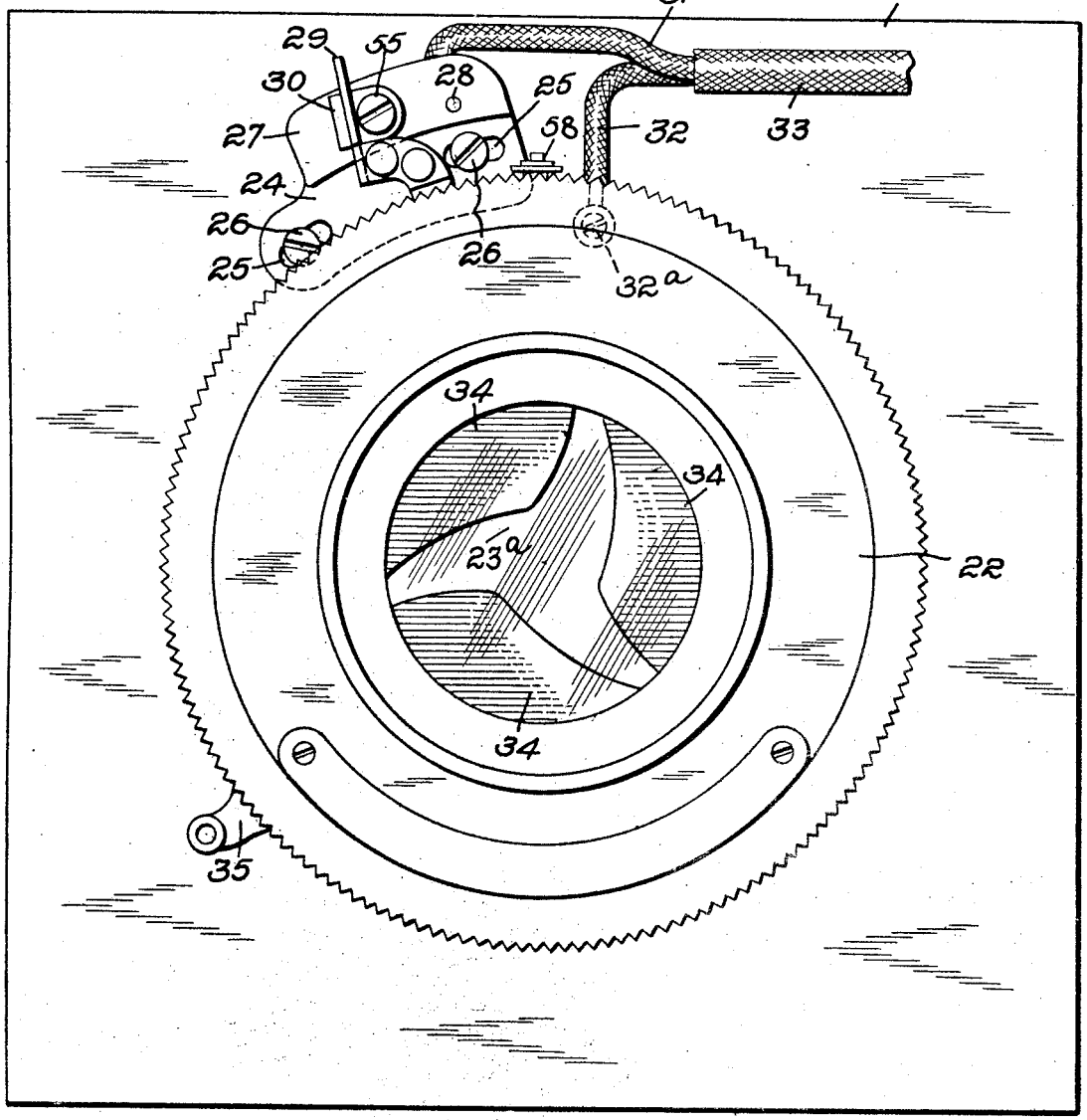
Fig. 4 is a view similar to Fig. 2, but wherein the shutter release has been depressed and the shutter leaves are being opened.
Figure 5:
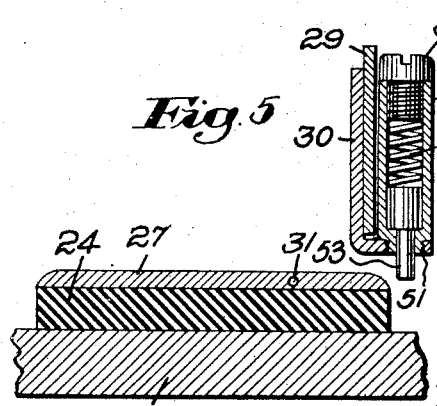
Fig. 5 is an enlarged cross section on the line 5—5 of Fig. 2.
Figures 6, 7:
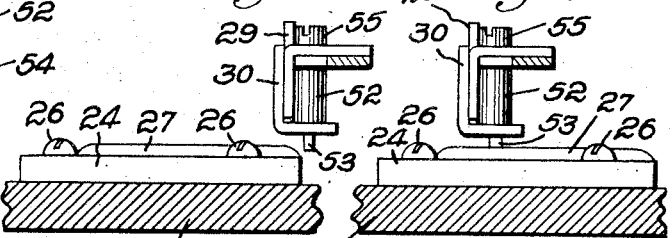
Fig. 6 is an enlarged detail of the synchronizer contact parts just before contact is made.
Fig. 7 is a view similar to Fig. 6, but wherein contact is being made.

This invention relates to photoflash synchronizers more especially pertaining to front shutters of the non-automatic or pre-set type. I have chosen to make this disclosure of an embodiment of the invention in connection with the well known make on any between-the-lens shutter having a reset or setting device, with slight modification of some of the parts of such a shutter. It is a well known fact that there is a definite or distinct, considerable time lag in photoflash bulbs extending from the time or instant of making the electrical contact to the peak of the flash in the flash bulb. This time lag is substantially or quite uniform in bulbs of the same manufacture. Therefore, if there is provided means properly to adjust the time lag that occurs between the time the shutter is released and the time the contact is made, such means, having once been adjusted, will continue to function satisfactorily with other bulbs of the same manufacture. It is recognized that there is also a time lag in the shutter extending from the time that the shutter is released until it reaches its full open condition. However, this time lag is somewhat shorter than the time lag in the flash bulb as the shutters are usually constructed. It is applicant's purpose to obtain and the means herein disclosed provide for a time interval between the instant of electrical contact and the instant that the shutter leaves actually start to open. This is extremely important because in actual practice it takes an appreciable time for the fuse and flash-bulb to become ignited after the contact occurs. This is a time lag or time interval.

In accordance with my invention, I provide for compensating for the entire difference in time lag so that the flash bulb and the shutter opening can be accurately synchronized.

The camera to which the invention is intended to be applied may, of course, be of any suitable type, such, for example, as the Speed Graphic camera. I have not, however, herein shown a camera, but I have represented the lens board of a camera at 20 in the several figures. In order to make clear the selected embodiment of my invention, which is directed to photoflash synchronizing means cooperating with a between-the-lens shutter, I have in Fig. 1 represented the said lens board 20 as having attached thereto the shutter flange 21 of a shutter 22, the said flange being attached to the lens board by screws or in any other well known manner.

The said shutter 22 may be any one of the well known makes of shutter. I have chosen, in this embodiment of my invention, to represent the well known Compur shutter, it being provided with a front lens cell 23 and with a rear lens cell (not shown). Attached to said lens board 20 is an adjustable plate 24 made of some suitable insulating material such as Bakelite. Said adjustable plate 24 is provided with slots 25, 25, and is attached to said lens board 20 by screws 26, 26 passing through said slots 25, 25, thus providing means for adjustment. This structure is clearly shown in Figs. 1, 2, 4 and 8.

Attached to the adjustable plate 24, so as to overlie flatwise the rear portion thereof, is a metal contact member or plate 27 held to the movable plate 24 by rivets 28, 28. A shutter setting or resetting lever or device indicated at 29, is mounted on the shutter actuating ring presently to be referred to, and has attached thereto a contact-member bracket 30 in any suitable or well known manner such as by rivets. The structure of the contact member itself will be presently fully described. Connected to the contact member or plate 2 lis a wire 31, and grounded to the shutter 22 is a second wire 32 by means of screw 32a. The wires 31 and 32 make up a cable 33. The said shutter 22 is also provided with the regular shutter blades or leaves 34, 34 and a release lever 35.

Referring more particularly to Fig. 3, wherein the cover plate of the shutter 22 has been removed so as most clearly to show the operating parts in so far as the present invention pertains thereto, it will be noted that said shutter 22 is provided with the usual shutter actuating or setting or operating ring 36 that is caused to move in a contraclockwise direction under the influence of the coiled spring 37. Said actuating or setting or operating ring 36 is usually, and irrespective of my invention, provided with a notch 38.

In order to coordinate the said shutter with or into my invention, I have provided said actuating or setting or operating ring 36 with a second notch 39 suitably spaced from the usual notch 38. A release dog 40 is caused to engage the said notch 39 when the said shutter actuating or setting or operating ring 36 has been moved as far as possible in a clockwise direction, thus tensioning the said release spring 37. The said release dog 40 is pivoted as indicated at 41, and has a relatively long arm 42 extending outwardly and forwardly, as indicated in Fig. 3. The shutter release lever 35 is provided with a notch 43 on its adjacent side for the purpose of engaging the said lever arm 42, and with a second notch 44 on the opposite side for engaging the end 45 of a cable release lever 46, the latter being pivoted on a pin 47 and caused to move in a contraclockwise direction under the influence of spring 48.

The said cable release lever 46 is provided with an elongated end portion 49 riding in a notch (not shown) of a cable release block 50. The shutter release lever 35 is held in the position shown in Fig. 3 under the influence of the lever end 45 engaging the said notch 44 and tending to move in a contraclockwise direction under the influence of the said spring 48. When the release lever 35 is turned contraclockwise viewing Fig. 3, the lever arm 42 is caused to move in a clockwise direction because of notch 43 of lever 35. The resulting action is to disengage the release dog 40 from the said second notch 39 of the shutter actuating or setting or operating ring 36, which will now travel in a contraclockwise direction, thus operating the shutter in a manner so well known in the art as not to require further description here.

The shutter leaves 34 actually start to open at the notch 38. The second, new or additional notch 39 is provided so that the contacts (yet to be described in detail) are separated when the release dog 40 is in notch 39. By this construction the shutter actuating ring 36 is moved beyond its normal setting position, and accordingly the contacts are separated for the purpose of availing of the time it takes the shutter actuating ring 36 to travel from said second or new notch 39 to a position close to notch 38, when contact is made. Actually the contact is made just before the notch 38 is reached. If the contact were made after the notch 38 was passed, the shutter leaves 34 would be already in motion, and it would be impossible to get sufficient time delay. Of course, the notches 38 and 39 can be spaced apart any distance that is desirable so that the contact can take place at any desired point between the notches 38 and 39, to get a greater time delay if desired. In practice the separation of the notches 38, 39, shown in Fig. 3, is sufficient, when contact plate 27 is properly adjusted to give sufficient time delay.

After the actuation of the shutter release lever 35, the shutter actuating or setting or operating ring 36 will move as previously described, carrying with it the arm 29 and also the shutter blades or leaves 34, 34, as indicated in Fig. 4, in which figure the shutter blades or leaves are represented as not yet fully opened, and the setting or resetting lever 29 as not yet having reached the end of its travel. As the shutter actuating or setting or operating ring 36 travels in a contraclockwise direction, the blades or leaves 34, 34 reach a fully opened position and then are closed just prior to the time that the shutter setting or resetting lever 29 reaches the end of its stroke or movement.

Referring to Figs. 4, 5, 6 and 7, and particularly to the three latter figures, the contact-member bracket 30 heretofore referred to, is represented as an L shaped structure having a hole 51 into which is riveted the lower end of a cylinder 52, wherein is fitted a plunger 53 thrust downward under the influence of a coiled spring 54. The said spring is held in place by a retaining screw 55 threaded into the said cylinder 52. The described structure forms a yielding contact means for the contact member or plate 27, when the shutter setting lever 29 travels in a contraclockwise direction.

The operation of the parts thus far described and the coordination thereof with the photoflash so as to constitute a synchronizer with and for the photoflash is as follows:

The shutter setting lever 29 is thrust or rotated as far as possible in a clockwise direction until the second or additional notch 39 is engaged by the dog 40, whereupon the shutter is in the set condition. The purpose of the said second or additional notch 39 is to provide for moving shutter actuating or setting or operating ring 36 to a greater distance than normal, in a clockwise direction, when setting or cocking the contact point 53 from the contact plate or member 27, thus allowing a time interval to occur between the time or instant that the shutter actuating or setting or operating ring 36 is released and the time or instant the shutter blades or leaves 34, 34 actually start to open. If the shutter actuating or operating ring 36 only travels sufficiently far for the dog 40 to engage the usually provided notch 38, the time interval before the making of a contact at the time the shutter blades or leaves 34, 34 started to open would be insufficient for accurately synchronizing the photoflash bulb with the shutter.

The average photoflash bulb as supplied today has a time delay between the instant of contact and the peak of the light intensity of twenty milliseconds, which is one-fiftieth of a second.

If, therefore, a contact brush or the like were secured to the shutter-leaf operating ring itself, such as is shown at B in Fig. 1 of the British patent to Picking No. 427,350, the shutter thereof would be fully closed before the peak of light intensity is reached. In a structure such as shown in said patent to Picking, the whole time between the start of opening of the shutter leaves and the instant of closing would be twenty milliseconds, and there could not be more than four or five milliseconds in the construction shown in said British patent, between the time of the starting of the shutter leaves to open from an overlapping position to the pin point opening, because the whole opening and closing of the Picking shutter would be twenty milliseconds.

I have, however, by the described means of the selected embodiment of my invention, provided within the shutter itself for an accurate, predetermined time delay. This same structure can be provided in any shutter of the general type of the Compur shutter, wherein such a ring as the shutter actuating or setting or operating ring 36 is used for operating shutter blades or leaves, and the ring 36 is preloaded as the shutter is set under the action of lever 29.

In the normal or standard structure as heretofore existing, the shutter actuating or setting or operating ring 36 would only be rotated a distance sufficiently far to cause the commencing of the opening of the shutter blades or leaves as the said shutter actuating or setting or operating ring 36 is released. In accordance with my invention, however, I provide means to cause the shutter actuating or setting or operating ring 36 to travel beyond said normal or standard distance and to be held in position by engagement of the notch 39 and the dog 40. When the dog 40 is released, the said ring 36 will travel that additional distance, which is represented by the space between the notches 38, 39 formed in the said actuating or setting ring 36. This distance need not be great, but it is important, however, that a definite time delay take place, as previously explained.

It will now be assumed for the purpose of full explanation that the shutter is set as indicated in Fig. 3. The shutter release lever 35 is pressed or moved contraclockwise. The shoulder of the notch 43 of said lever 35 will contact with the end of the arm 42 of the dog 40 and will cause the said dog 40 to rotate in a clockwise direction about its pivot 41, withdrawing the said dog 40 from the notch 38, thus allowing the shutter actuating or setting or operating ring 36 to travel in a contraclockwise direction under the influence of the said spring 37. As the said shutter actuating or setting or operating ring 36 starts to rotate in a contraclockwise direction, carrying with it the contact cylinder 52 and contact point 53 which will now be in the position represented in Fig. 5, further movement of the shutter actuating or setting or operating ring 36 and of the contact point 53 will cause said contact point 53 effectively to touch or engage the contact plate 27, thus completing the circuit shown in Fig. 11 through the said contact plate 27, wire 31, battery 56, photoflash bulb 57, wire 32, grounding screw 32a and the shutter 22.

As the shutter actuating or setting or operating ring 36 continues to rotate in a contraclockwise direction, the contact point 53 moves over the plate or member 27 until the shutter setting lever 29 reaches the position shown in Fig. 8.

The time of actual contact can be varied and in this embodiment of my invention, it is done by loosening contact-plate screws 26, 26, and moving the supporting plate 24 for the contact plate or member 27 either in a contraclockwise direction to increase the time delay, or in a clockwise direction so as to shorten the time delay. As pointed out herein, the shutter actuating or operating ring 36 is manually moved in a clockwise direction, putting a tension on spring 37, and when the said shutter actuating or operating ring 36 is released by the dog 40, said ring 36 will start to travel in a contraclockwise direction, but will not start to move the shutter leaf-actuating ring itself (which ring is not herein shown, but is present in Compur and like shutters) until the said ring 36 has traveled in a contraclockwise direction some little distance, thus providing a definite delay between the time or instant when contact to the flash bulb is made and that time or instant when the shutter leaves commence opening. The said ring 36 actuates a shutter ring (not shown) by cam means (not shown, but which structure is very well known in all shutters of the pre-set type). In the present invention, no drag is thereby put on the shutter leaf-actuating ring. Therefore, there is no slowing up of the operating mechanism.

I believe myself to be the first to provide a definite time delay or interval between the instant that contact to the photoflash bulb is made and the instant that the shutter leaves actually start to open.

Thus it will be seen that I have provided a very simple and yet very effective and convenient means for accurately synchronizing a photoflash lamp with a between-the-lens shutter and that I have provided means for adjusting or changing the length of the delay of the occurrence of the contact with respect to the opening of the shutter blades or leaves 34, 34 of the shutter.

Fig. 4 represents the shutter setting or resetting lever or device 29 as carrying the contact member bracket 30 in a contraclockwise direction. Such contraclockwise movement continues until the position is reached that is shown in Fig. 8, wherein it is to be understood that the shutter blades or leaves having been both opened are again closed, thus making an exposure. The circuit is completed as previously described, thus effecting the flashing of the flash bulb at the very time the shutter was fully opened.

Some types of Compur shutters are already provided with a time-delay mechanism, which uses an additional travel of the shutter setting or resetting lever or device such as 29 to set the time delay. In such construction, to limit the motion of the shutter setting lever 29 when time delay is not required, a latch-out button 58 is provided, as shown in Figs. 1, 4 and 8. When the said latch-out button 58 is pressed rearwardly, the shutter setting lever or device 29 can travel a greater distance in slot 59, which slot is clearly shown in Fig. 1. When this type of Compur shutter is to be used for synchronizing in accordance with my invention, the said retarding mechanism is removed from the shutter (as it indeed is never used by the press photographer) and the said remaining structure permits of or affords the ready application of my invention and provides for the additional travel that is required for synchronization, and thus for the coordination of the various elements entering into my invention. In such case the said latch-out button 58 is locked in a depressed condition at all times. On those Compur or like shutters that are not equipped with a time-delay mechanism, the slot 59 must be elongated for a sufficient distance to allow the shutter setting or resetting lever or device 29 to travel far enough to allow the dog 40 to engage the second notch 39 which I provide.

By my invention I have provided a shutter synchroniznig means that is more accurate, more reliable and more compact than any synchronizing means previously invented, so far as I am aware. Furthermore the mechanism disclosed by me is such that it is always carried on the lens board of the camera and in no way interferes with the normal operation of the camera, it permits ready interchange of various lenses, and, since each shutter must of necessity be synchronized separately, my invention is peculiarly advantageous as the mechanism is so inexpensive that each shutter can be provided with its own synchronizer which is accurately synchronized to that particular shutter. Therefore, a synchronizing mechanism is provided for each shutter and lens, and thus no further adjustments are required after the lens and the shutter have been put in position in the camera.

This has proved to be a decided advantage in rapid operation, particularly in newspaper work, where the photographer frequently has to use a lens of rather short focal length to cover some certain assignment and then almost immediately afterwards is compelled to switch to a lens of longer focal length, and frequently does not then have time to make any adjustment with respect to the heretofore provided synchronizers. Therefore, my invention permits a more rapid operation of the camera, since each lens is provided with its own suitably adjusted synchronizing means as herein explained.

Having thus described one illustrative embodiment of the invention, it is to be understood that although specific terms are employed, they are used in a generic and descriptive sense, and not for purposes of limitation, the scope of the invention being set forth in the following claims.

I claim:

1. As a new article of manufacture and sale for use with photographic cameras, a between-the-lens shutter having provisions for electrical connections to a photoflash bulb, a lens board or support for said shutter adapted for ready application to a camera, a movable shutter setting and actuating member having a contact in circuit with said electrical connections to the photoflash bulb, another contact also in circuit with said electrical connections and carried upon the stationary part adjacent to said movable shutter setting and actuating member, holding and releasing means for said member, said member having two formations cooperating with said holding and releasing means, one of which formations is the usual holding formation and the other of which, being a special formation, is positioned to provide throw-lengthening means for lengthening the actuating movement of said member, and causing the initiation of said actuating movement to begin prior to the start of shutter opening, so that the meeting of said contacts occurs at a distinct or definite time interval prior to the start of movement of the shutter in and for the purpose of opening.

2. In combination, a between-the-lens shutter having movable shutter setting and actuating means, a photoflash bulb, electrical connections including said shutter and said bulb, a lens board or support for said shutter adapted for ready application to a camera, a movable shutter setting and actuating member having a contact in circuit with said electrical connections to the photoflash bulb, another contact also in circuit with said electrical connections and carried upon the stationary part adjacent to said movable shutter setting and actuating member, holding and releasing means for said member, said member having two formations cooperating with said holding and releasing means, one of which formations is the usual holding formation and the other of which, being a special formation, is positioned to provide throw-lengthening means for lengthening the actuating movement of said member, and causing the initiation of said actuating movement to begin prior to the start of shutter opening, so that the meeting of said contacts occurs at a distinct or definite time interval prior to the start of movement of the shutter in and for the purpose of opening, and means for adjusting the relative positions of said contact members with relation to the direction of actuating movement of said shutter actuating member, thereby establishing a definite time interval following the meeting of said contacts prior to the commencement of the opening of said shutter.

3. In combination, a between-the-lens shutter having shutter setting and actuating means, a photoflash bulb, an electrical circuit including the electric contacts of said shutter and said bulb and also including two coacting electrical contact members, one of which is attached to the shutter support, and the other of which is carried by the said shutter setting and actuating means, and means for adjusting the relative positions of said contact members with relation to the direction of actuating movement of said shutter setting and actuating means, thereby establishing a definite time interval following the meeting of said contact members prior to the commencement of the opening of the shutter, said means including two formations, one of which is the usual holding formation and the other of which is the notch formation 39, being a special holding formation, and which latter formation is so positioned with relation to the said usual formation in a ring 36 of the shutter setting and actuating means as to provide for a longer than normal movement of said ring 36, and also including means to adjust the position of one of said electrical contact members in a direction circumferentially of the said ring 36.

4. In combination, a between-the-lens shutter having shutter setting and actuating means, a photoflash bulb, an electrical circuit including said shutter and said bulb, and also including two co-acting electrical contact members, one of which is attached to the shutter support, and the other of which is carried by the said shutter setting and actuating means, and means for adjusting the relative positions of said contact members with relation to the direction of actuating movement of said shutter setting and actuating means, thereby establishing a definite time interval following the meeting of said contact members prior to the commencement of the opening of the shutter, said means including, in addition to the usual notch 38 of the shutter setting and actuating ring 36, a second notch 39 so positioned as to provide for a longer than normal actuating movement of said ring 36.

5. In combination, a between-the-lens shutter having shutter setting and actuating means, a photoflash bulb, an electrical circuit including said shutter and said bulb and also including two co-acting electrical contact members, one of which is attached to the shutter support, and the other of which is carried by the said shutter setting and actuating means, and means for adjusting the relative positions of said contact members with relation to the direction of actuating movement of said shutter setting and actuating means thereby establishing a definite time interval following the meeting of said contact members prior to the commencement of the opening of the shutter, said means including a usual holding notch and also a special notch 39 of the shutter setting and actuating ring 36, said special notch being so positioned as to obtain a longer movement of the said ring 36 when released, a dog 40 to engage said notches, and means to engage and release said dog.

6. In combination, a between-the-lens shutter having shutter setting and actuating means including a shutter setting and actuating ring 36 movable contraclockwise when being actuated and movable clockwise when being set, a photoflash bulb, an electrical circuit including said shutter and said bulb and also including two co-acting electrical contact members, one of which is attached to the shutter support, and the other of which is carried by the said shutter setting and actuating means, and means for adjusting the relative positions of said contact members with relation to the direction of actuating movement of said shutter setting and actuating means, thereby establishing a definite time interval following the meeting of said contact members prior to the commencement of the opening of the shutter, said means including a second notch 39 in said ring 36 in addition to the usual notch 38 thereof, so positioned as to cause said ring 36 to travel further in a clockwise direction to be set, one of said contact members being carried by said ring 36, so that the said prolonged setting movement of the ring 36 positions said last mentioned contact member an increased distance from the other contact member, thus to allow a greater time interval to take place between the time the shutter actuating ring 36 is released and the shutter leaves actually start to open.

7. In combination, a between-the-lens shutter having a movable shutter setting and actuating member including shutter actuating ring 36, a photoflash bulb, electrical connections including said shutter and said bulb, a lens board or support for said shutter adapted for ready application to a camera, a movable shutter setting and actuating member having a contact in circuit with said electrical connections to the photoflash bulb, another contact also in circuit with said electrical connections and carried upon the stationary part adjacent to said movable shutter setting and actuating member, holding and releasing means for said member, said member having two formations cooperating with said holding and releasing means, one of which formations is the usual holding formation and the other of which, being a special formation, is positioned to provide throw-lengthening means for lengthening the actuating movement of said member, and causing the initiation of said actuating movement to begin prior to the start of shutter opening, so that the meeting of said contacts occurs at a distinct or definite time interval prior to the start of movement of the shutter in and for the purpose of opening, and means for adjusting the relative positions of said contact members with relation to the direction of actuating movement of said shutter actuating member, thereby establishing a definite time interval following the meeting of said contacts prior to the commencement of the opening of said shutter, said combination including a shutter setting lever 29 mounted on said ring 36 and having a contact member bracket 30 attached thereto, one of said contact members being of plate form adjustable in a direction circumferentially of said ring 36, and the other contact member being a spring actuated plunger 53 in a cylinder wherein said plunger is mounted.

8. In combination, a between-the-lens shutter having shutter setting and actuating means including a shutter setting and actuating ring 36 movable contraclockwise when being actuated and movable clockwise when being set, a photoflash bulb, an electrical circuit including said shutter and said bulb and also including two co-acting electrical contact members, one of which is attached to the shutter support, and the other of which is carried by the said shutter setting and actuating means, and means for adjusting the relative positions of said contact members with relation to the direction of actuating movement of said shutter setting and actuating means, thereby establishing a definite time interval following the meeting of said contact members prior to the commencement of the opening of the shutter, said means including two holding formations, one of which formations is the usual holding formation and the other of which is a notch 39 in said ring 36 so positioned with relation to said usual holding formation of said ring as to cause a prolonged travel of said ring in being set, one of said contact members being supported by and movable with said ring and the other of said contact members being of plate-like form and mounted upon the support for the shutter in proximity to said ring.

9. As a new article of manufacture and sale for use with photographic cameras, a between-the-lens shutter of the radially-acting leaves type, having provisions for electrical connections to a photoflash bulb, a lens board or support for said shutter adapted for ready application to a camera, a movable shutter setting and actuating member having a contact in circuit with said electrical connections to the photoflash bulb, another contact also in circuit with said electrical connections, and carried upon a stationary part adjacent to said movable shutter setting and actuating member, and means operatively associated in action with said member to lengthen the shutter actuating movement of said member by causing initiation of said shutter actuating movement to begin prior to the start of opening movement of said radially acting shutter leaves, thereby to cause the meeting of said contacts at a predetermined time interval prior to the start of movement of the said shutter leaves in and for the purpose of opening, said means to lengthen the shutter actuating movement of the shutter actuating means including two holding formations on said shutter actuating means for engagement by a holding part, one of said formations being the usual holding formation and the other being a special holding formation, so spaced from said usual holding formation on said shutter actuating means, as to lengthen the shutter actuating movement of said shutter actuating means, and co-acting means to vary said predetermined time interval.

10. In combination, a between-the-lens shutter having shutter setting and actuating means, a photoflash bulb in electrical circuit with said shutter, and means including a contact in said circuit on a fixed part of the structure, and another contact in said circuit, carried by said shutter setting and actuating means, and means operatively associated in action with said shutter actuating means to lengthen the shutter actuating movement of said actuating means by causing initiation of the shutter actuating movement of said actuating means to begin prior to the start of opening movement of the shutter, thereby to cause the meeting of said contacts at a predetermined time interval prior to the start of movement of the shutter in and for the purpose of opening, said means to lengthen the shutter actuating movement of the shutter actuating means including two holding formations on said shutter actuating means for engagement by a holding part, one of said formations being the usual holding formation and the other being a special holding formation, so spaced from said usual holding formation on said shutter actuating means, as to lengthen the shutter actuating movement of said shutter actuating means.

CLARENCE H. VAN DUSER.